United States Patent
Toshimitsu et al.

[11] Patent Number: 6,133,561
[45] Date of Patent: Oct. 17, 2000

[54] ELECTRIC REVOLVER AND ELECTRIC MICROSCOPE

[75] Inventors: Kunio Toshimitsu, Yokohama; Masahiko Otomo, Fujisawa, both of Japan

[73] Assignee: Nikon Corporation, Tokyo, Japan

[21] Appl. No.: 09/146,316

[22] Filed: Sep. 3, 1998

[30] Foreign Application Priority Data

Sep. 10, 1997 [JP] Japan ................................. 9-244967
Dec. 12, 1997 [JP] Japan ................................. 9-343355

[51] Int. Cl.⁷ .......................... G02B 21/00; G02B 21/26; G02B 7/02
[52] U.S. Cl. ......................................... 250/201.3; 359/368
[58] Field of Search ......................... 250/201.3; 359/368, 359/384, 391–393, 821, 822, 827

[56] References Cited

U.S. PATENT DOCUMENTS

| | | | |
|---|---|---|---|
| 4,653,878 | 3/1987 | Nakasato et al. | 359/392 |
| 5,517,353 | 5/1996 | Itoh et al. | 359/388 |
| 5,706,127 | 1/1998 | Saito et al. | 359/381 |
| 5,719,699 | 2/1998 | Otomo | 250/201.3 |
| 5,737,134 | 4/1998 | Watanabe et al. | 359/821 |

FOREIGN PATENT DOCUMENTS 7-311343  11/1995  Japan .

Primary Examiner—Stephone B. Allen
Attorney, Agent, or Firm—Vorys, Sater, Seymour & Pease, LLP

[57] ABSTRACT

An object of the present invention is to provide an electric microscope in which a liquid can be easily filled and removed when an immersion objective lens is inserted or removed into or from an optical path of the microscope. According to the present invention, there is provided an electric microscope comprising an electric revolver with a plurality of objective lenses mounted thereon, either one of which objective lenses disposed on an optical path, a revolver position detecting device for detecting a rotational position of the electric revolver to obtain information related to the objective lens disposed on the optical path, an instruction device for issuing an instruction to change over objective lenses to be disposed on the optical path by electric force, further comprising a memory device which stores information whether each of the plurality of objective lenses is of liquid-permeated type or not, and a control device which controls the drive of the electric revolver so as to stop the electric revolver at a rotational position in the midst of the change-over when it judges that either the objective lens currently on the optical path or an objective lens to be disposed on the optical path next is an immersion objective lens, based on an instruction from the instruction device.

14 Claims, 13 Drawing Sheets

| CHANGE OVER DATA | 1⇔2 | 2⇔3 | 3⇔4 | 4⇔5 | 5⇔6 | 6⇔1 |
|---|---|---|---|---|---|---|
| PULSE NUMBER DATA | a | b | c | d | e | f |

| OBJECTIVE DATA | | 1 | 2 | 3 | 4 | 5 | 6 |
|---|---|---|---|---|---|---|---|
| PULSE NUMBER DATA | FORWARD | a1 | b1 | c1 | d1 | e1 | f1 |
| | REVERSE | a2 | b2 | c2 | d2 | e2 | f2 |

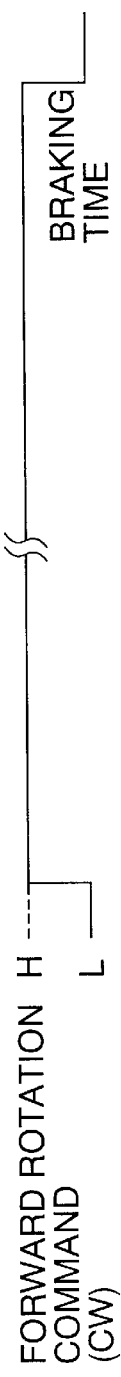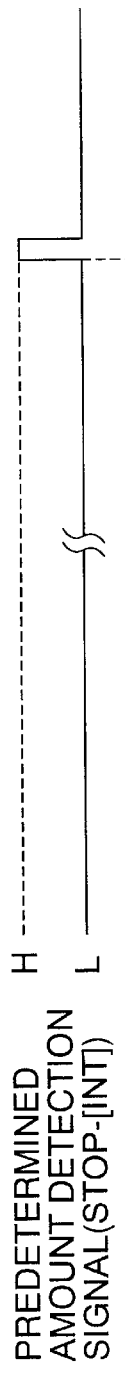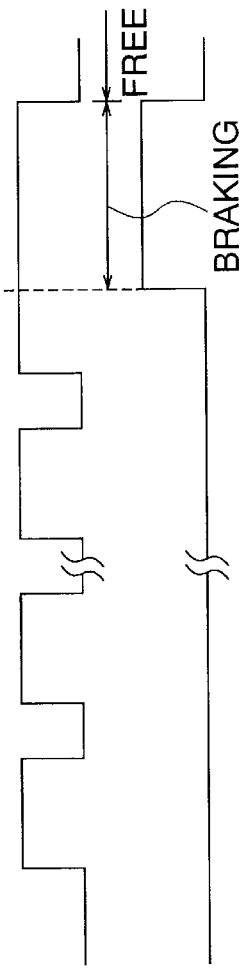
FIG. 9A FORWARD ROTATION COMMAND (CW)
FIG. 9B REVERSE ROTATION COMMAND (CCW)
FIG. 9C STOP POSITION DETECTION SIGNAL (STOP-POSI)
FIG. 9D PREDETERMINED AMOUNT DETECTION SIGNAL (STOP-[INT])
FIG. 9E MOTOR OUTPUT "+"
FIG. 9F MOTOR OUTPUT "−"

ELECTRIC REVOLVER AND ELECTRIC MICROSCOPE

This application claims the benefits of Japanese Application, Nos. 9-244967 and 9-343355 which are hereby incorporated by reference.

BACKGROUND OF THE INVENTION

1. Field of the Invention

The present invention relates to an electric microscope and an electric revolver device used in a microscope, etc.

2. Related Background Art

Recently, electrification and automation have been advanced in the field of microscopes, so as to save unnecessary works of an operator other than a observation of a specimen. Particularly, most of high-grade microscopes already have an electrified focusing stage, revolver, or the like. As electric revolter devices suitable for such electric microscopes, there are proposed a revolver device which has a forward-rotation button and a reverse-rotation button provided on a console panel of a microscope so that an objective lens is changed over to an adjacent objective lens one by one by one of these two buttons, a revolver device which on a console panel has buttons respectively corresponding to all of the objective lenses mounted on revolver body so that any of the objective lenses can be directly inserted into an optical path of the microscope by operating the corresponding button or the like.

As objective lenses to be mounted on the revolver body of the microscope, there are proposed an immersion objective lens with a liquid such as water or oil filled in a gap between the tip end of the objective lens and a specimen to be used, and a dry objective lens with nothing to be filled (a gap between the objective lens and a specimen is filled with an air) to be used.

When a specimen is observed by using an immersion objective lens, it is necessary to pour water or oil into a gap between the objective lens and the specimen by a dropping pipette or the like. In this case, if objective lenses are changed over electrically in a conventional microscope, an immersion objective lens is instantly disposed on an optical path. In this condition, a space between the specimen and the immersion objective lens is very small, so that it is difficult to conduct a liquid pouring operation. In such case, it is required, after disposing the immersion objective lens, to widen the space between the objective lens and the specimen by slightly lowering a stage, and then, after dropping the liquid on the specimen, to set the sight by elevating the stage until the liquid reaches the tip end of the objective lens. It is also proposed that only when that an objective lens is changed over to an immersion objective lens, the liquid is poured in the gap between the objective lens and the specimen by manually rotating the revolver, and not by using an electric change-over in accordance with a switch operation.

Also in case that an immersion objective lens is changed over to a dry type objective lens, it is required to remove the liquid filled between the objective lens and the specimen.

However, in the conventional microscope, it is troublesome to conduct an operation of filling or removing the liquid which is to be conducted as described above. Moreover, it is required to conduct a manual operation when the immersion objective lens is used, and an electric operation otherwise, which spoils the advantages of the electrification.

A specific structure of an electric revolver device is disclosed in Japanese Patent Application Laid-Open No. 7-311343. In this electric revolver device, a revolver with a plurality of objective lenses mounted thereon is rotated with a motor, and the final positioning of rotation is mechanically conducted by a click stop mechanism.

The click stop mechanism is composed of a leaf spring provided with a steel ball and a rail with a V-shaped groove. The leaf spring is provided on a retaining member for rotatably retaining the revolver, and the rail is provided on the revolver. The steel ball is pressed against the rail by the leaf spring, and the steel ball is dropped into the V-shaped groove due to this pressing force, so as to position the revolver. In order to conduct this positioning accurately, in the click stop mechanism of the electric revolver device, a pressure larger than that in a manually-operated revolver is applied mechanically.

When the revolver is rotated in a predetermined amount, the brake is electrically applied on the motor. However, a timing of applying the brake is adjusted by the width of a slit plate provided on the revolver, or controlled by an electric delay circuit which delays a detection signal from a photo-interrupter for detecting a slip position of the slit plate.

In the above-mentioned electric revolver device, the V-shaped groove of the click stop mechanism may be abraded or a lubricating oil may run out due to a secular change. Accordingly, for the objective lenses which have been frequently changed over, an overrun or a short-run may occur at the time of positioning.

In order to avoid this, a timing of applying the brake on the motor is adjusted, by adjusting the slit width of the above-mentioned slit plate, or adjusting a delay time caused by the delay circuit. However, such adjustment is effected for all of the objective lenses mounted on the revolver, so that an objective lens requiring no adjustment is affected. As a result, if a precision in positioning each of the objective lenses varies widely, a precise positioning can not be achieved for all of the objective lenses.

Also, it is required to precisely position the revolver at a stop position, a large operational torque (drive force) is required correspondingly to a mechanical pressure of the click stop mechanism, which results in an increased size of the motor to be used. If the size of the motor is increased, the entire size of the revolver device is increased. As disclosed in Japanese Patent Application Laid-Open No. 7-311343, if the motor is received inside the revolver, a center portion of the revolver is protruding, so that it becomes difficult to attach or detach the objective lenses.

SUMMARY OF THE INVENTION

The present invention was conceived taking the problems as described above into consideration, and an object of the invention is to provide an electric microscope in which a liquid can be easily filled or removed at the time of attaching or detaching an immersion objective lens to or from an optical path of the microscope.

Another object of the present invention is to provide an electric revolver device which can position each of objective lenses with precision all the time even if a precision in positioning for each of the objective lenses varies widely.

Still another object of the present invention is to provide a small-sized electric revolver device which can reduce a pressure and a drive torque of a click stop mechanism to thereby reduce the size of a motor used, so as to be receivable inside the revolver.

According to a first aspect of the present invention, there is provided an electric revolver device comprising: a revolver body which retains a plurality of objective lenses; a positioning device which mechanically positions the revolver body at a predetermined rotational position; an instruction device which instructs a change-over of the plurality of objective lenses; a motor which drives and rotates the revolver body; a rotation detecting device which detects an amount of rotation of the motor; a memory device which stores data according to the amount of rotation of the motor at the time of change-over of the objective lenses in accordance with data of the plurality of objective lenses; and a drive control device which reads out the data stored in the memory device in response to the instruction of change-over from the instruction device and drives the motor until the read-out data concurs with the amount of rotation of the motor detected by the rotation detecting device.

According to the above-mentioned electric revolver device, the objective lenses can be positioned with a high accuracy all the time even if a precision in positioning varies widely for each of the objective lenses.

Preferably, the motor is a DC motor and the rotation detecting device is a rotary encoder which is integrally formed with the motor.

According to the above-mentioned electric revolver device, it is possible to reduce a pressure and a drive torque of a click stop mechanism to thereby reduce the size of a motor to be used therein. As a result, it is possible to provide a small-sized revolver device which can be received inside the motor.

Preferably, the data according to the amount of rotation of the motor stored in the memory device is substantially corresponding to the central angle between apertures for installing the plurality of objective lenses, and the drive control device comprises a detection unit for detecting that the amount of rotation of the motor reaches the amount of rotation corresponding to the read-out data, so as to apply the brake on and stop the rotation of the motor in response to a signal from the detection unit.

According to the above-mentioned electric revolver device, it is possible to reduce a pressure and a drive torque of a click stop mechanism to thereby reduce the size of a motor to be used therein. As a result, it is possible to provide a small-sized revolver device which can be received inside the motor.

Preferably, there is further provided a setting device which can set each of plural pieces of data separately in the memory device as data in accordance with an amount of rotation of the motor.

According to the above-mentioned electric revolver device, since the operator can arbitrarily effect control on data at the time of rotation of the revolver body, it is possible to rotate the revolver body with a small driving force. Also, since the mechanical pressure is reduced, a certain effect can be obtained also for the vibration.

Preferably, there is further provided a position detecting device for detecting whether a rotational position of the revolver body is at the stop position regulated by the positioning device or not, and when the revolver body is not positioned at the stop position, the drive control device corrects the rotational position of the revolver body to dispose the revolver body at the stop position in response to a signal from the position detecting device.

According to above-mentioned electric revolver device, even if mechanical parts of the positioning device is abraded due to secular change to cause an overrun or a short-run of the revolver body, the revolver body is automatically corrected to the stop position. As a result, it is possible to provide an electric revolver device free of maintenance.

Preferably, the drive control device updates the data stored in the memory device corresponding to the objective lens with the corrected position of rotation, based on the information on the amount of rotation of the motor when the rotational position of the revolver body is corrected.

According to the above-mentioned electric revolver device, it is possible to smoothly change over the objective lenses all the time since control data at the time of rotation of the revolver is automatically updated proper one.

According to another aspect of the present invention, there is provided an electric revolver device comprising: a revolver body which retains a plurality of objective lenses; an instruction device which instructs a change-over of the plurality of objective lenses; a motor which drives and rotates the revolver body; a rotation detecting device which detects information according to an amount of rotation of the motor; a memory device which stores plural pieces of data according to an amount of rotation of the revolver body at the time of change-over of the objective lenses in accordance with the data of the plurality of objective lenses; a setting device which is capable of separately setting each of the plural pieces of data stored in the memory device; and a drive control device which controls the drive of the motor in response to a change-over instruction from the instruction device in accordance with the plural pieces of data stored in the memory device.

According to still another aspect of the present invention, there is provided an electric revolver device comprising: a revolver body which retains a plurality of objective lenses; an instruction device which instructs a change-over of said plurality of objective lenses; a motor which drives the revolver body; a rotation detecting device which detects information according to an amount of rotation of the motor; a memory device which stores plural pieces of data according to an amount of rotation of the revolver body at the time of change-over of the objective lenses in accordance with data of the plurality of objective lenses; a drive control device which controls the drive of the motor in response to a change-over instruction form the instruction device in accordance with the plural pieces of data stored in the memory device; a positioning device which mechanically positions the revolver body at a predetermined position of rotation; and a position detecting device which detects whether the rotational position of the revolver body is set at a stop position regulated by the positioning device or not, wherein the drive control device sets said revolver body to the stop position by correcting the rotational position of the revolver body in response to a signal from the position detecting device to dispose the revolver body to the stop position when the revolver body is not positioned at the stop position.

An electric microscope according to the present invention comprises: a plurality of objective lenses; a revolver body with the plurality of objective lenses mounted thereon any one of which lenses is disposed in an optical path; revolver position detecting means which detects a rotational position of the revolver body so as to obtain the information related to the objective lens disposed in the optical path; instruction means which issues an instruction for changing over the objective lenses to be disposed in the optical path by an electric force; memory means which stores information whether each of the plurality of objective lenses is of liquid immersion type or not; and control means which controls the drive of the revolver body so as to stop the revolver body at a rotational position in the midst of the change-over of the revolver body when it judges that at least one of the objective lens currently on the optical path and an objective lens to be next disposed on the optical path is an immersion objective lens when receiving a change-over instruction from the instruction means, based on a signal from the revolver position detecting means and the information stored in the memory means.

According to the above-mentioned electric microscope, when the objective lens is changed over to an immersion objective lens, and when the immersion objective lens is changed over to another type of objective lens, the revolver is stopped at the rotational position in the midst of the change-over. As a result, it becomes drastically easier to fill, replenish, or remove the liquid used for the immersion objective lens.

Preferably, the above-mentioned electric microscope further comprises alarming means which is connected with the control means, and is adapted to report the operator that no objective lens is disposed on the optical path when the revolver body is stopped at a rotational position in the midst of the change-over.

According to the above-mentioned electric microscope, it is possible for the operator to easily know that the objective lens is not disposed correctly on the optical path by use of the alarming means.

Preferably, the control means controls the drive of the revolver body in such a manner that when an instruction of change-over is received from the instruction means for the second time after the revolver body is stopped at the rotational position in the midst of the change-over, the instructed objective lens is disposed on the optical path.

According to the above-mentioned electric microscope, it is possible to dispose the objective lens stopped in the midst of the change-over on the optical path in a simple manner.

Preferably, the control means controls the revolver body to rotate at a lower velocity than the normal change-over velocity when the immersion objective lens is removed from the optical path or inserted into the optical path.

According to the above-mentioned electric microscope, the revolver body moves at a low velocity when the immersion objective lens is disposed on the optical path and when it is removed from the optical path, air bubbles are hardly generated in a liquid between the objective lens and a specimen, so that there is no chance for the liquid to scatter around.

Preferably, the above-mentioned electric microscope further comprises data input means which receives information related to the plurality of objective lenses mounted on the revolver body.

Preferably, the above-mentioned electric microscope further comprises a motor for driving and rotating the revolver body which is rotated together with the plurality of objective lenses and an encoder for detecting an amount of rotation of the motor, and the control means judges whether or not the revolver body is at the rotational position in the midst of the change-over on the basis of an output from the encoder.

BRIEF DESCRIPTION OF THE DRAWINGS

FIGS. 9A, 9B, 9C, 9D, 9E and 9F are timing charts of control signals.

DESCRIPTION OF THE PREFERRED EMBODIMENTS

[First Embodiment]

Figure 1:
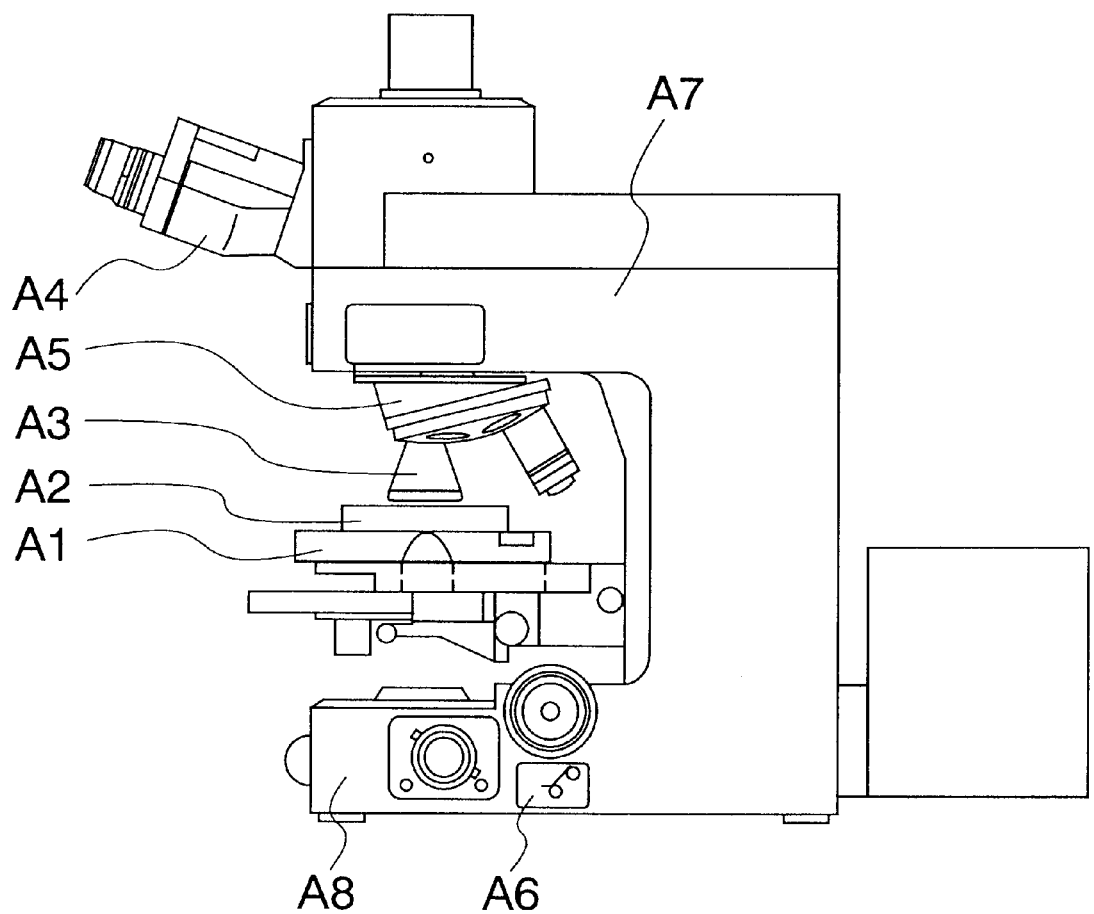
FIG. 1 is a side view of an electric microscope which is provided with an electric revolver device according to the present invention.

FIG. 1 is a side view of an electric microscope provided with an electric revolver device of the present invention.

Referring to FIG. 1, a specimen A2 is mounted on a stage A1. A light beam from the specimen A2 is guided to an eyepiece A4 through an objective lens A3, so that the image of the specimen is observed. An electric revolver A5 for retaining (or mounting) a plurality of objective lenses is attached to an arm portion A7 of the microscope. The objective lenses are changed over by operating a change-over instruction device A6 which is disposed on a base portion A8 of the microscope. The change-over instruction device A6 is provided with a switch for forwardly rotating the revolver A5, and another switch for reversely rotating the revolver A5. By turning each of these switches, an objective lens currently disposed on an optical path of the microscope is changed over to an adjacent objective lens.

Figure 2:
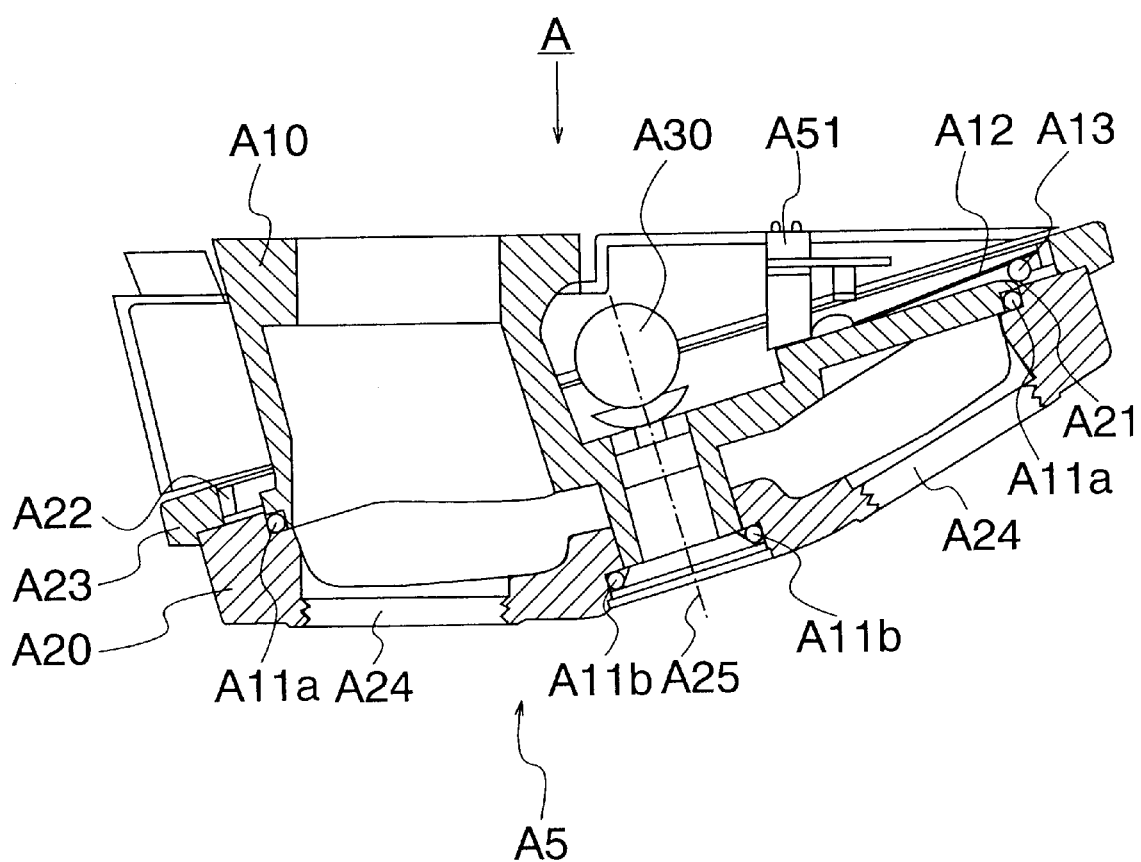
FIG. 2 is a side view for showing a schematic structure of the electric revolver device.
Figure 3:
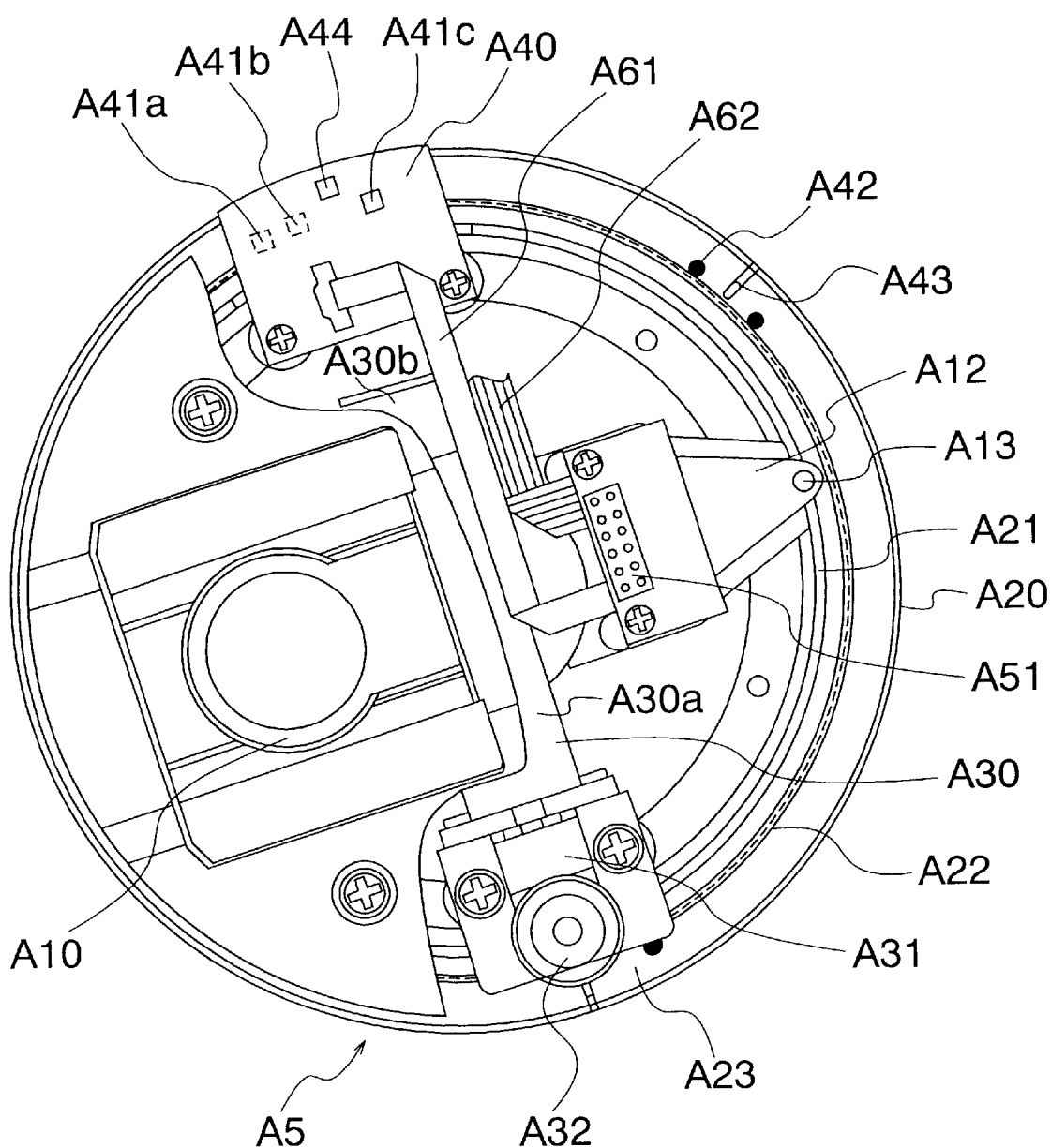
FIG. 3 is a view taken along the arrow A in FIG. 2.

FIG. 2 is a side view for showing a schematic structure of the electric revolver A5, while FIG. 3 is a view taken along the arrow A in FIG. 2, for partially showing an internal structure of the electric revolver A5.

The electric revolver A5 is provided with a fixed member A10, a revolver body (or rotating member) A20, and a motor A30, and is detachably attached to the arm portion A7 of the microscope. The revolver body A20 is supported around the center axis A25 of rotation to be rotatable with respect to the fixed member A10 with bearing balls A11a, A11b. A gear ring A23 having an inner gear A22 is fixed to the revolver body A20. The revolver body A20 is provided with six holes A24 for installing the objective lenses. The holes A24 are provided concentrically around the center axis A25 of rotation. Accordingly, a central angle between adjacent holes for installing the objective lenses is 60 degrees.

A click stop mechanism is composed of a spring A12, a steel ball A13, and a rail A21. One end of the spring A12 is fixed to the fixed member A10. The steel ball A13 is supported by the other end of the spring A12, and the steel ball A13 is pressed against the rail A21 which is provided on the revolver body A20 by the spring A12. When the steel ball A13 which was retained by the spring A12 falls into a V-shaped groove provided on the rail A21, the revolver body A20 is positioned so as to dispose one of the objective lenses on the optical path of the microscope.

A motor A30 is disposed on the rotational shaft of the revolver body A20, and is fixed to the fixed member A10. The rotational shaft of the motor A30 is disposed perpendicular to the rotational shaft of the revolver body A20. The rotational shaft of the motor A30 is engaged with the inner gear A22 through rotation transmitting mechanisms A31, A32 which are provided on the fixed member A10. Accordingly, when the motor A30 is rotated, the revolver body A20 is rotated through the rotation transmitting mechanism A31, A32 and the gear ring A23.

The electric revolver A5 is provided with a revolver position detecting device A40 which detects whether the revolver body A20 is disposed at a predetermined stop position (the position at which the rotation is stopped by the click stop mechanism and one of the objective lenses is disposed on the optical path of the microscope) or not. This revolver position detecting device A40 is fixed to the fixed member A10. The revolver position detecting device A40 is provided with a Hall-effect device IC A44 for detecting a magnet A43 which is disposed on the gear ring A23 of the revolver body A20. The magnets A43 are provided at six positions correspondingly to the six holes for installing the objective lenses, and the Hall-effect device IC A44 is arranged to detect the magnet A43 only when the revolver body A20 is positioned at the predetermined stop position.

This revolver position detecting device A40 is also provided with another Hall-effect device ICs A41a, and A41b, A41c for detecting the magnets A42 which are provided on the gear ring A23 of the revolver body A20. Address of the hole A24 disposed on the optical axis is detected in accordance with the combination of the Hall device ICs detecting the magnet A43.

A stop position detecting signal and an address detecting signal from the revolver position detecting device A40 are sent to a CPU on the microscope body side through a wiring A61 and connector plate A51. The microscope body is provided with another connector plate (not shown) corresponding to the connector plate A51. When the electric revolver A5 is mounted on the microscope body these connector plates are connected with each other to transmit various kinds of signals. Also, a control signal from the CPU is sent to the motor A30 through the connector plate A51 and a wiring A62. This structure will be described in detail later.

The motor A30 used in this embodiment is integrally formed with a DC motor body A30a and a rotary encoder A30b. The rotary encoder A30b is used for detecting an amount of rotation of the DC motor body A30a. The motor A30, i.e., the DC motor integrally formed with the rotary encoder is of a small size with a small operating torque, and is disposed on a retaining or fixed member A10 so as to be received inside the revolver body A20. That is, the motor A30 is disposed in a dead space inside the electric revolver A5. This dead space is a space which is generated inside the electric revolver A5 when a rotating face of the revolver body A20 is inclined with respect to a plane crossing the optical axis of the objective lens. As a result, it is possible to reduce the size of the electric revolver A5 which is composed of the fixed member A10 and the revolver body A20 to a required minimum.

Figure 4:
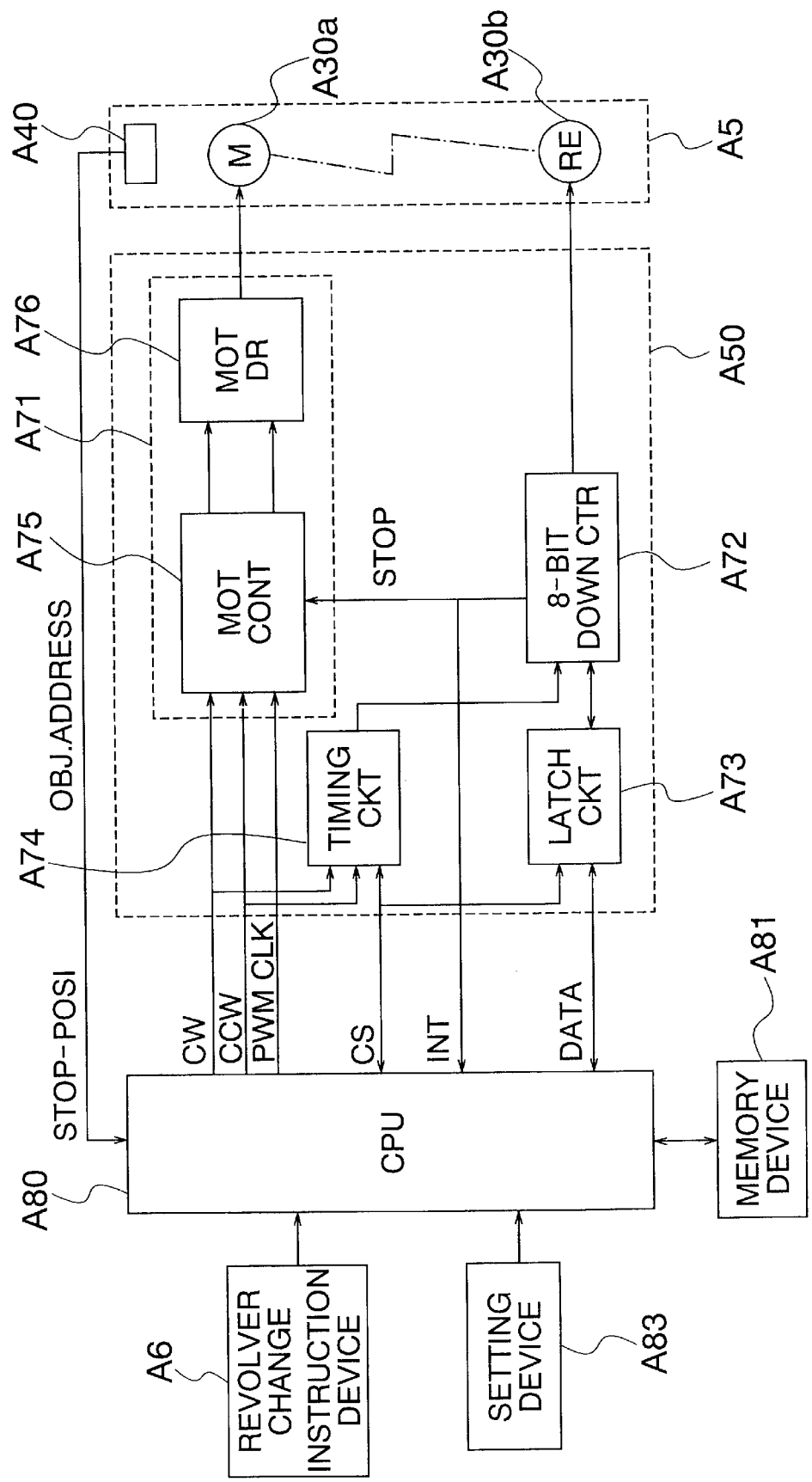
FIG. 4 is a block diagram for showing the structure of the electric revolver device.

FIG. 4 is a block diagram of an electric revolver device according to the present embodiment.

A revolver drive device A50 provided in the microscope body is composed of a control unit A71 which controls the DC motor body A30a inside the electric revolver A5 in response to a rotation command or a stop (brake) command from a CPU A80, an 8-bit down counter A72 which receives a pulse from the rotary encoder A30b inside the electric revolver A5, counts down from a preset control data to output a signal indicating the detection of a predetermined amount, a latch circuit A73 which temporarily stores the control data, and a timing circuit A74 which loads the control data onto the 8-bit down counter A72.

The control unit A71 is composed of a motor controller A75 for controlling a direction of rotation of the motor and drive of the motor to be effected by the PWM (pulse width modulation) system and a motor driver A76. According to the PWM system, it is possible to control a drive velocity by adjusting a pulse width of a PWM clock signal so as to change over the revolvers at a velocity suitable for the user. The pulse width can be adjusted by a setting device A83.

The microscope body comprises a CPU A80 for generally controlling a drive of the electric revolver A5 and a change-over operation of the objective lenses, a memory device A81 for storing various kinds of information for driving the electric revolver A5, and a change-over instruction device A6. The setting device A83 is connected with the microscope body, so as to conduct various setting operations for driving the electric revolver A5 with respect to the CPU A80.

A motor rotation direction command (CW, CCW), a PWM clock signal (PWM CLK), and control data (DATA) from the CPU A80 are sent to the revolver drive device A50. A stop position detection signal (STOP-POSI) and an address detection signal (OBJ. ADDRESS) from the revolver position detecting device A40 inside the electric revolver A5 are sent to the CPU A80.

The memory device A81 temporarily stores the last stop position detection signal from the revolver position detecting device A40. This signal is used when the direction of the rotation in correction mode control is judged, which is to be described later. Hereinafter, this stored data is called an overrun flag or a short-run flag.

Description will be made below on the number of rotations of the DC motor body A30a which is required for rotating the revolver body A20 in a desired amount and for switching over the objective lenses.

Figures 5A, 5B, 5C:
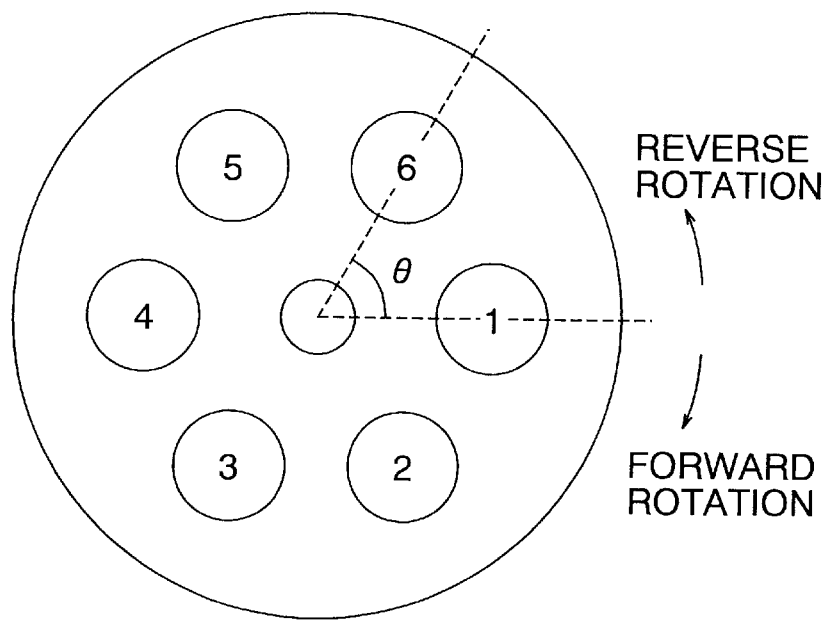
FIG. 5A shows an address of the revolver.
FIGS. 5B and 5C show examples of control data stored in a memory device.

As shown in FIG. 5A, when the revolver body A20 is of the type having six holes, a gear train of the rotation transmitting mechanisms A31, A32 is arranged such that, when the revolver body A20 is rotated once, a gear head output shaft of the body A30a of the DC motor 61 is rotated about 20 times. The number of rotations becomes 15×20=300 for one round of the revolver body A20 when a gear ratio of the gear head of the DC motor body A30a is 15:1. The rotation becomes 300÷6=50 between the holes of the revolver body A20. The number of pulse signals when the rotary encoder A30b with four pulses for one rotation is used is 50×4=200.

Here, in order to stop the rotation of the DC motor body A30a, it is required to apply the brake. The motor is slightly rotated while the brake is being applied. Taking such circumstance into consideration, the data on the number of pulses as the control data between holes A24 is set to, for example, 198. This control data is substantially corresponding to the central angle θ (60 degrees) between the adjacent revolver holes.

If the data 198 on the number of pulses as the interhole control data is set by the setting device A83, the data on the number of pulses (a=198, b=198, c=198, d=198, e=198, and f=198) are stored in the memory device A81, as shown in FIG. 5B, in accordance with the interhole data or change over data. These values (a to f) may be the same, or may be different from each other. It is assumed that the revolver body A20 in the present embodiment is manufactured to have six holes and all of the central angles between each adjacent holes are equal to each other. Accordingly, all of the control data are assumed to take the same value. In the case of a revolver having seven holes, for example, which is difficult to be manufactured to have all central angles equal to each other, each control data is separately set in accordance with a central angle between each adjacent holes.

Also, as shown in FIG. 5C, the data on the number of pulses (a1 to f1, a2 to f2) may be stored, in accordance with data on each of the objective lenses, separately, for the change-over to the forward rotation and for the change-over to the reverse rotation from the objective lens. The change-over control can be effected more accurately taking the characteristics, etc., of the motor when the data is separated for the forward rotation and the reverse rotation.

Next, an operation of the electric revolver device will be described with reference to FIGS. 6, 7 and 8 for showing a control sequence of the CPU A80 and FIG. 9 for showing timing charts of various kinds of control signals. Steps S1 to S6 shown in FIG. 6, and steps S10 to S19 shown in FIG. 7, and steps S20 to S25 shown in FIG. 8 respectively denote the control steps to be effected by the CPU A80. Here, it is assumed that the control data between the holes of the revolver or the rotation velocity data of the revolver body, and the like, are initially set by the setting device A83.

First, the CPU A80 clears the overrun flag and the short-run flag to zero at step S1. Next, the flow advances to step S2, and outputs PWM clock data corresponding to the rotation velocity of the revolver body A20. Next, the CPU A80 advances to step S3 at which it continues to wait a rotation input command.

On this occasion, since receiving an objective address detection signal from the revolver position detecting device A40, the CPU A80 recognizes an objective lens currently disposed on an optical path. Then, when receiving a forward or reverse rotation command from the change-over instruction device A6, the CPU A80 reads out control data corresponding to the change-over data of the objective lens from the memory device A81 at step S4, and outputs the data to a latch circuit A73. For example, when an objective lens attached to the address No. 2 is to be changed over to an objective lens attached to the address No. 1, the data "a" shown in FIG. 5B is supplied to the latch circuit A73. Also, according to the rotation command, a rotation command for a forward rotation (CW) or that for a reverse rotation (CCW) is supplied to a motor controller A75 and a timing circuit A74 (step S5). In specific examples shown in FIGS. 9A and 9B, the rotation command for forward rotation (CW) is output. Moreover, at step S5, a PWM clock is supplied, in addition to this rotation command, to the motor controller A75.

On this occasion, the motor controller A75 transmits a rotation command output which is synchronized with the PWM clock to the DC motor body A30a through a motor driver A26. A specific example of this signal is shown as a motor output "+" in FIG. 9E. It should be noted that in this case a motor output "−" remains zero (see FIG. 9F).

A stop position detection signal (STOP-POSI) from the revolver position detecting device A40 is at an L level at the normal stop position (see FIG. 9C).

When the DC motor body A30a starts to rotate, the stop position detection signal is changed over from L to H (see FIG. 9C). The rotary encoder A30b outputs a pulse signal to the 8-bit down counter A72 in accordance with a rotation of the DC motor body A30a.

The data stored in the latch circuit A73 is loaded onto the 8-bit down counter A72. The loading of the data is effected in response to a chip select signal (CS) from the CPU A80.

The 8-bit down counter A72 starts a countdown from the stored data when the pulse is supplied. When the counted-down data becomes zero, a predetermined amount detection signal (STOP) is supplied to the motor controller A75 (see FIG. 9D). The motor controller A75, upon receiving this signal, transmits a brake signal to the motor driver A76 in order to stop the motor body A30a immediately.

Until the DC motor body A30a is completely stopped, the rotational shaft of the motor is slightly rotated. That is, the revolver body A20 is rotated for a predetermined distance including a backlash. In the mean time, a pulse signal (which is calculated as of 2 pulses or around in the present embodiment, but depends on the strength of the brake) is transmitted from the rotary encoder A30b to the 8-bit down counter A72. Since a count value of the 8-bit down counter is zero, this pulse signal is not counted.

In this manner, the revolver body A20 is rotated in an amount including the control data (198) and a predetermined distance added to this control data (198), so that an objective lens after the change-over is positioned by the click stop mechanisms A12, A13, A21.

The predetermined amount detection signal (STOP) is transmitted also to the CPU A80 as an interrupt signal (INT signal). The CPU A80 waits at step S6 until this signal is supplied.

The CPU A80 which receives the INT signal at step S6 advances to step S7, waits for a predetermined time during which the motor controller A75 applies the brake, and then, after the predetermined time, outputs a rotation command signal (CW/CCW) in order to free (open) an output of the DC motor body A61.

Next, the CPU A80 advances to read the stop position detection signal (STOP-POSI) at step S8, and judges whether or not the revolver stops at the normal position. If the revolver stops at the normal position (the signal is at an L level), the CPU A80 returns to step S3 for the second time, and waits for a rotation command input. If the stop position detection signal is abnormal (an H level) at step S8, the CPU starts to control in a correction mode.

Figure 7:
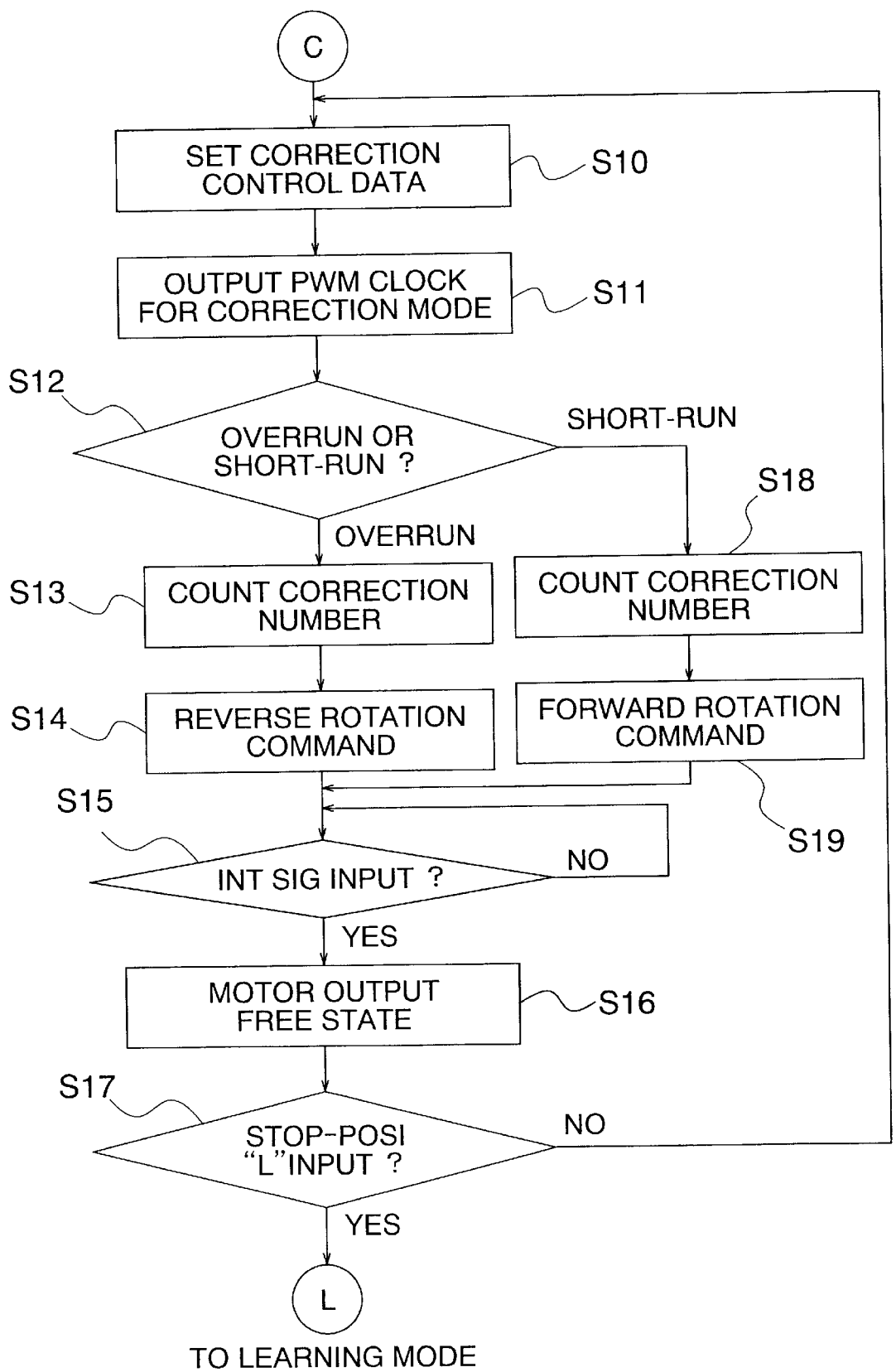
FIG. 7 is a flowchart showing a control sequence in a correction mode of the electric revolver device.
Figure 8:
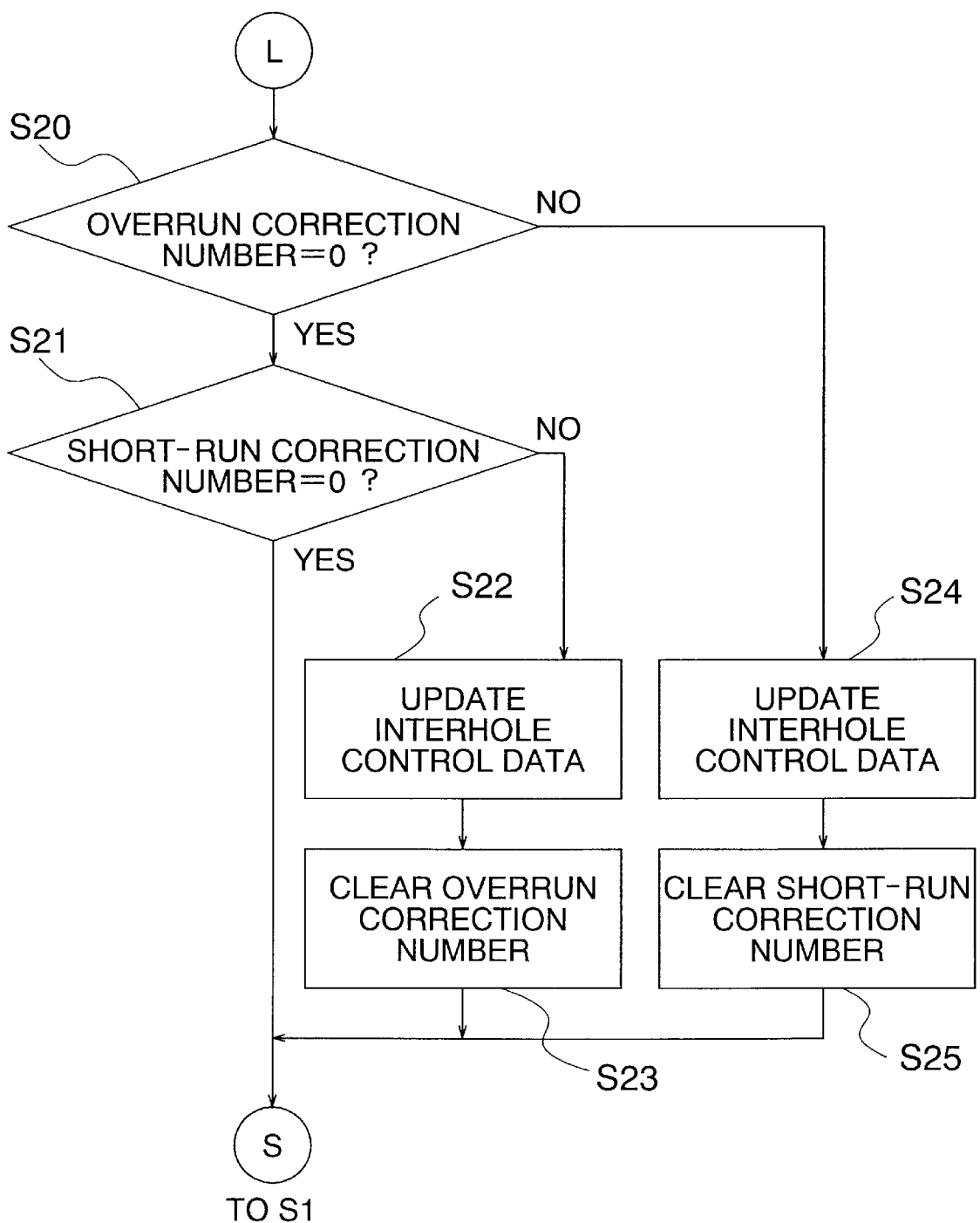
FIG. 8 is a flowchart showing a sequence of a learning function of the electric revolver device.

FIG. 7 shows a control sequence of the correction mode.

First, the CPU A80, when starting the correction mode, sets at step S10 the correction data to be stored in the latch circuit A72 to correction control data (2) which is widely smaller than ordinary control data (198). Also, in order to operate the revolver body A20 at a velocity lower than that of the normal control, the PWM clock data is set to the correction mode data at step S1.

Next, at step S12, the above-mentioned overrun flag and short-run flag are respectively checked to determine the direction of rotation for the correction control, whereby the correction control is started. It should be noted that these flags are issued in accordance with a stop position detection signal finally detected, and it can be judged whether the flag is the overrun flag or the short-run flag by comparing targeted stop position detection signals with each other. If it is judged that the flag indicates overrun at step S12, the CPU A80 advances to step S13 to count the number of corrections, and outputs a rotation command in a direction reverse to that at the time of change-over at step S14. After that, the CUP waits that an INT signal is supplied from the 8-bit down counter A72 (step S15), sets a motor output in a free state (step S16). After that, the CPU A80 confirms the stop position detection signal from the revolver position detecting device A40 (step S17).

Also when the CPU A80 judges that the flag indicates short-run at step S12, the CPU A80 counts the number of corrections in the same manner at step S18, and outputs the rotation command in a direction reverse to that for the change-over at step S19. After that, the flow advances to step S15.

Figure 6:
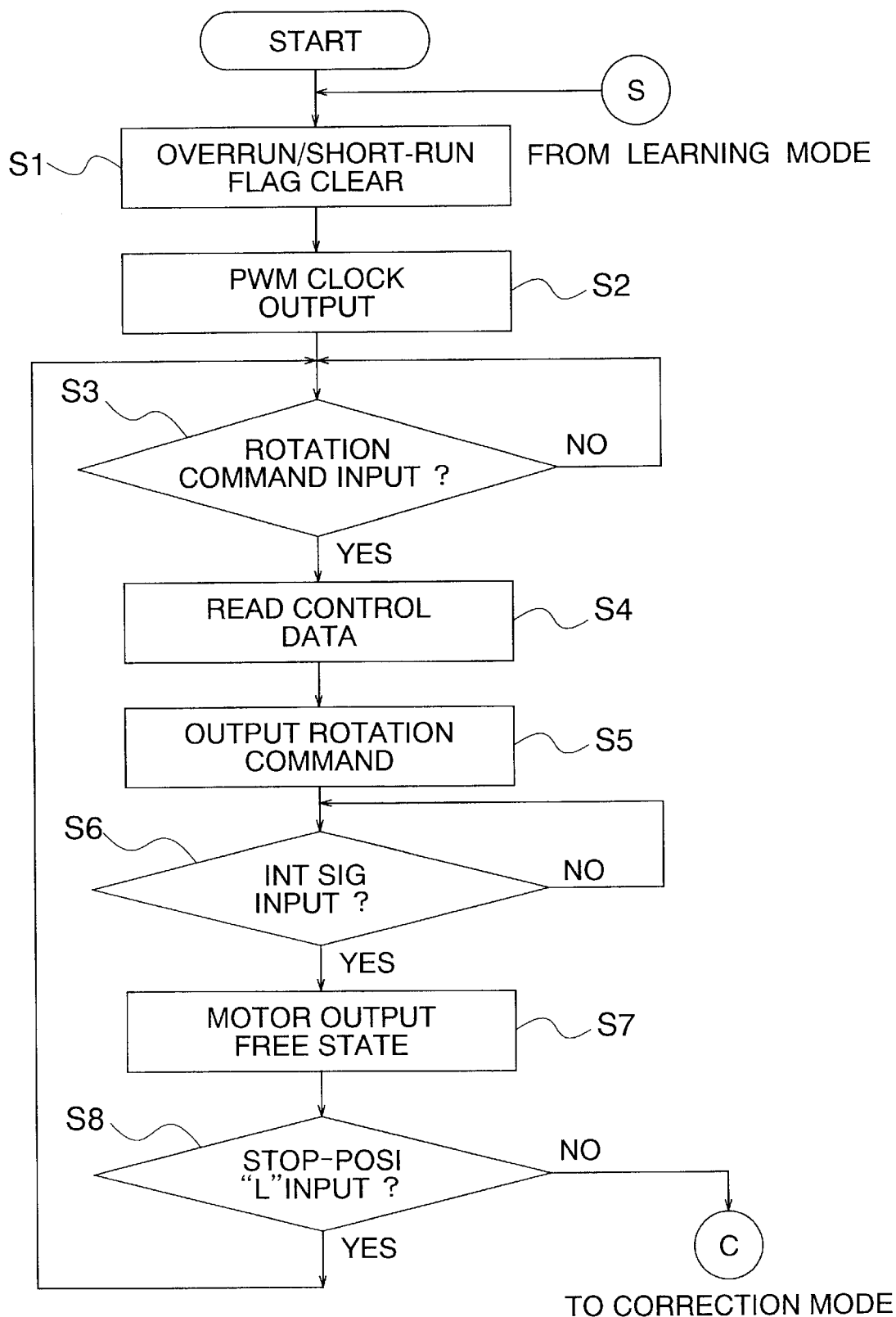
FIG. 6 is a flowchart showing a control sequence of the electric revolver device.

The control steps at steps S14 to S17 and the control steps at step S19 and steps S15 to S17 are the same as those at steps S5 to S8 shown in FIG. 6.

When confirming that the stop position detection signal (STOP-POSI) is at the normal position (the L level), the CPU A80 advances to the control sequence for the learning mode. When judging that the signal is at an abnormal position (the H level), the CPU A80 returns to a start of the correction mode (step S10), so as to effect the correction control for the second time. In this case, at steps S13 and S18, the number of corrections is set by adding one at a time to the previous data, whereby it can be judged how many times the correction operation has been repeated.

Thus, the correction control is repeated until the stop position signal (STOP-POSI) is set at the normal position.

Next, the learning mode control will be described. FIG. 8 is a flowchart for showing a control sequence of the learning mode.

In the learning mode, first the number of overrun corrections and the number of short-run corrections are confirmed at steps S20 and S21, so as to confirm a direction and an amount of the correction. Then, at step S22 or S24, the interhole control data stored in the memory device A81 is updated by the confirmed number of corrections. For example, when an objective lens at the address No. 2 is changed over to an objective lens at the address No. 1, if the number of overrun corrections is 5, the flow advances from step S20 to step S24 at which 10 (=5×2) is subtracted from the control data "a" (=198) shown in FIG. 5B to be updated to 188. When the data is stored as shown in FIG. 5C, the control data "b2" (=198) is updated to 188.

After that, the number of corrections is cleared at steps S23 and S25, and the flow returns to step S1 shown in FIG. 6. The subsequent control steps are conducted with the updated data (188).

By use of an electric revolver device having the above-mentioned structure, it is possible to reduce the size of an electric revolver and enhance the service life thereof. Even when the mechanical parts are abraded due to secular change or the oil is used up to cause an overrun or a short-run, the CPU automatically effects correction and updates the subsequent control data. As a result, there arises no defective operation.

An accuracy of the stop position which was to be adjusted manually in a conventional device becomes completely programmed so that an electric revolver device free of maintenance can be attained, which will largely save a labor of the operator and will bring about great effects leading to cost reduction.

Also, in the electric revolver device of the present embodiment, unlike in a conventional device, the positioning is not effected by the click stop mechanism by finally rotating the motor with inertia, but the motor is rotated and stopped by an amount of rotation corresponding to the control data whether it is stopped at the stop position by the click stop mechanism or not. In this manner, it is possible to reduce a mechanical pressure of the click stop mechanism. Since the final positioning can be effected in the correction mode, it also becomes possible to rotate the revolver with a small drive force. In addition, the reduction of the mechanical pressure can bring about some effect to vibration.

It is also possible to easily stop an objective lens temporarily at an intermediate position in the midst of the change-over of objective lenses, by altering or setting the control data shown in FIG. 5B or FIG. 5C into an arbitrary value, which is a function becoming effective when the immersion objective lens enters or leaves the optical path. Not only for the immersion objective lens, but also the dry type objective lens the function can be used to make a mark on a specimen, by stopping the rotation temporarily in the midst of the change-over. In this case, when these objective lenses are changed over with each other, it is required to program that the sequence does not advance to the correction mode or the learning mode.

In the present embodiment, the revolver driving device A50, the CPU A80, and the memory device A81 are incorporated in the microscope body. However, these devices may be provided on side of the electric revolver A5.

Moreover, the change-over instruction device A6 is not limited to the type of having a forward rotation switch and a reverse rotation switch, but may be of a type which, for example, can directly select an objective lens at an arbitrary address. In this case, the memory device A81 stores control data in accordance with, for example, an information on objective lens immediately before or after the change-over (all of combinations thereof).

This function of the electric revolver device can be employed, not only for the objective lenses, but for another optical member change-over device.

[Second Embodiment]

An electric microscope according to a second embodiment of the present invention will be described below. The electric revolver device of the first embodiment can be used in this electric microscope.

Figure 10:
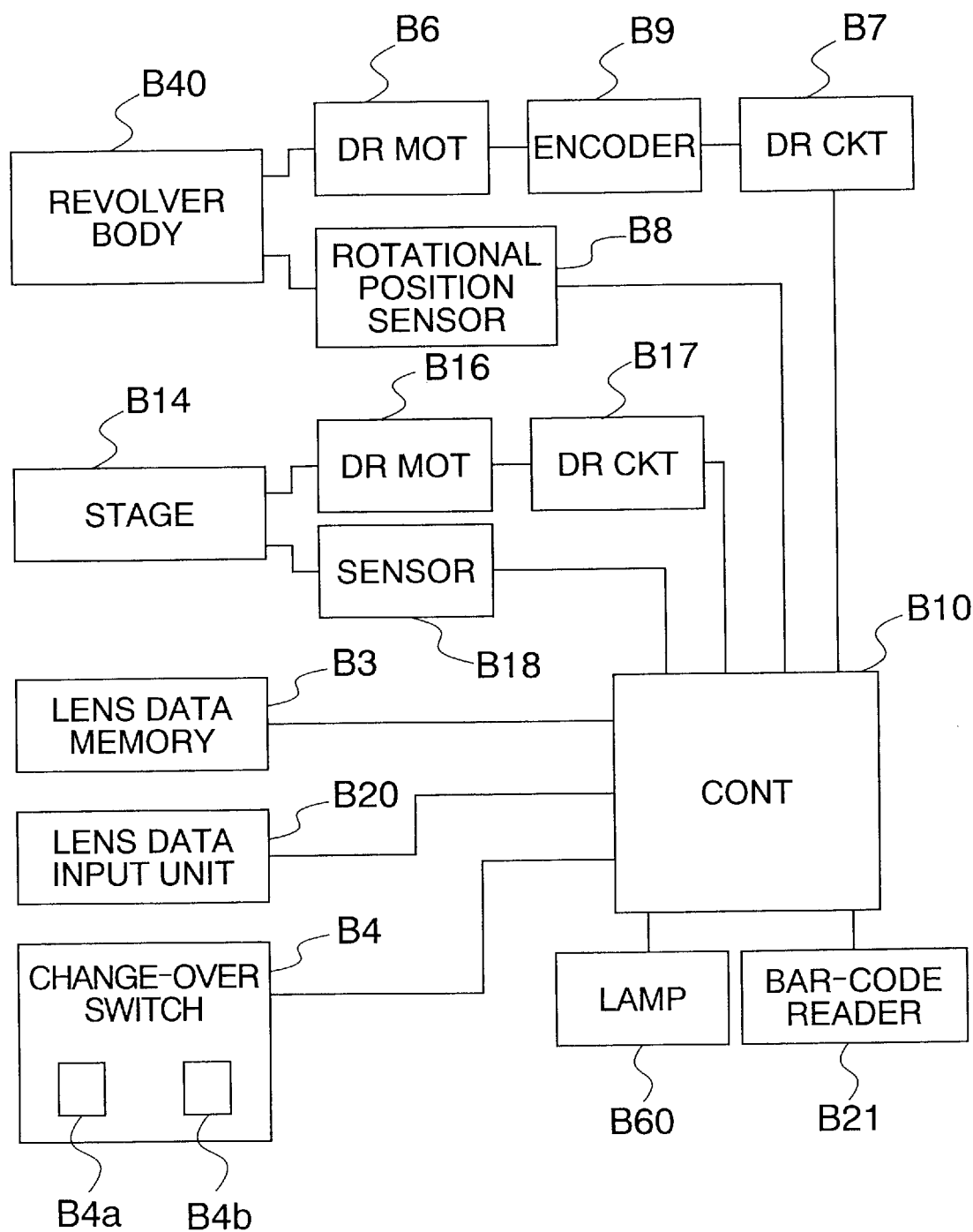
FIG. 10 is a block diagram of a microscope according to an embodiment of the present invention.
Figure 11:
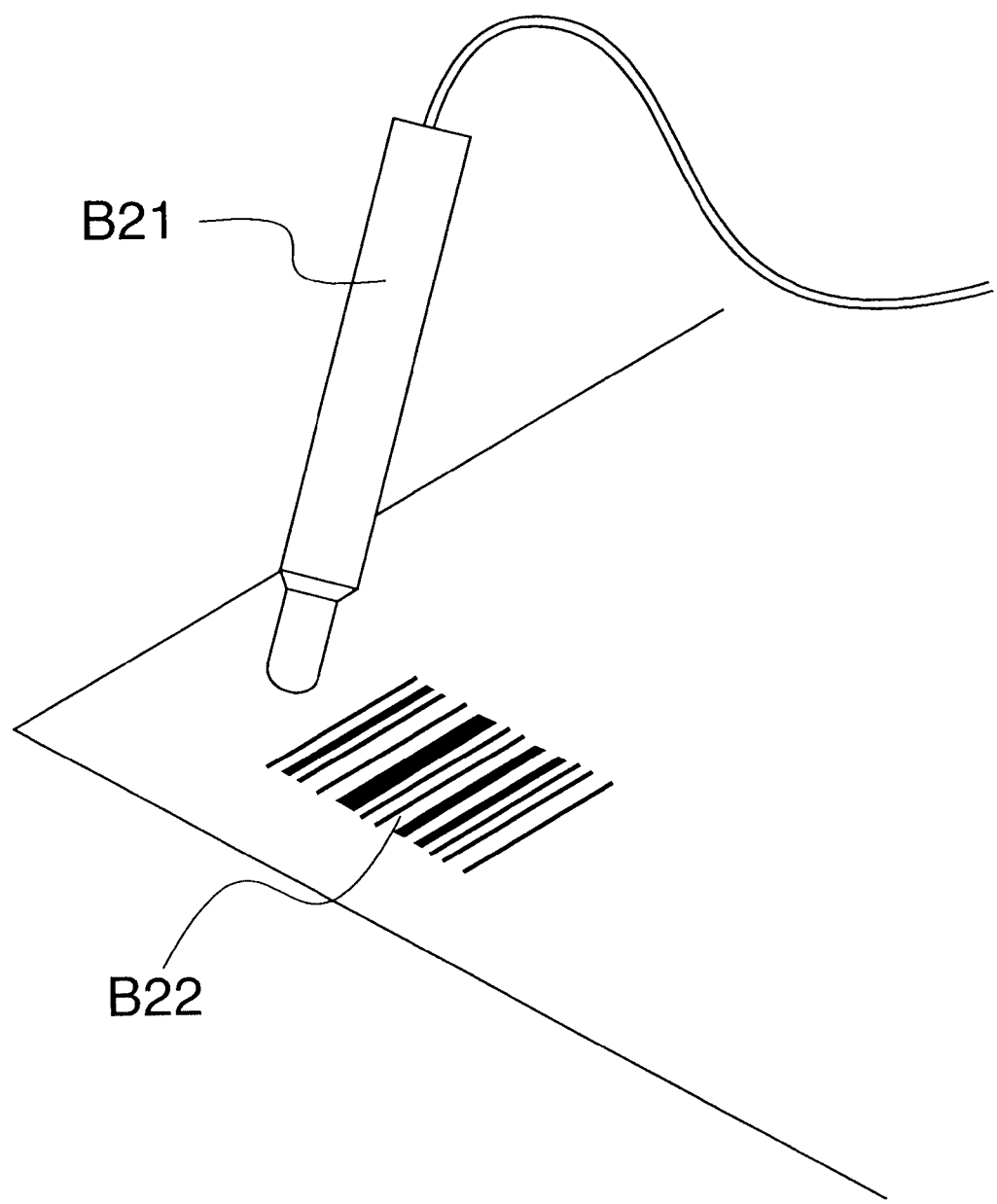
FIG. 11 is a view for showing a manner of inputting objective lens data.

FIG. 10 is a block diagram of a microscope according to an embodiment of the present invention, and FIG. 11 is a view for showing one example of a manner of inputting objective lens data.

A microscope B1 is provided with a data input unit B20 for inputting data of objective lenses, an objective lens data memory unit B3, a control circuit B10, a revolver body B40, a revolver change-over switch B4, a revolver driving motor B6, a revolver drive circuit B7, a rotational position sensor B8 for detecting a rotational position of the revolver which is composed of a magnet and a Hall-effect device (or for detecting an address of a revolver hole at which an objective lens disposed on an optical path of the microscope is positioned), an encoder B9 for detecting the current rotational position of the revolver body B40 by detecting the rotational position of the revolver driving motor B6, a stage B14, a stage driving motor B16, a stage drive circuit B17, a sensor B18 for detecting a Z-directional position of the stage, and a lamp (alarming means) B60 for informing that no objective lens is disposed on the optical path.

Here, in the present embodiment, the encoder B9 is used as a member for detecting the rotational position of the revolver driving motor B6. However, a potentiometer may be used, instead. The alarming means is not limited to one which appeals to the sense of vision, such as the lamp B60, but may be ones which appeals to the sense of hearing, such as a buzzer.

The revolver change-over switch B4 in the present embodiment is provided with two switches, that is, a forward rotation switch B4a and a reverse rotation switch B4b. The control circuit B10 causes the revolver B40 to rotate forwardly or reversely depending on one change-over instruction from each of the switches, to switch over from the objective lens currently on the optical axis to an adjacent objective lens.

The data input unit B20 is used to receive objective lens data including the type of an objective lens to be mounted on the revolver body B40 (the liquid immersion type, the dry type, or the like), magnification, WD (working distance), NA (numerical aperture), parfocal length (a length from the focal position of the objective lens to the attaching surface which is a reference plane at the time of the mounting of the objective lens on the revolver body.), and the received data is stored in the objective lens data memory unit B3 through the control circuit B10 as the data base corresponding to each objective lens. More specifically, the above-mentioned data related to the objective lenses is stored in accordance with the address of a revolver hole in which each of the objective lenses is provided (which address corresponds to a detection signal from the revolver rotational position sensor B8).

The data is received by this data input unit B20, for example, as shown in FIG. 11, by reading the objective lens data such as a magnification of the objective lens which is denoted by a bar code B22 on a predetermined sheet by a bar code reader B21, or inputting the data with a ten key (not shown).

The objective lens data memory unit B3 also stores the data related to the focal position of the stage corresponding to each of the objective lenses.

The control circuit B10 controls the drive circuit B7 based on a change-over instruction of the revolver change-over switch B4, and rotates the motor in a predetermined direction, thereby positioning an objective lens corresponding to the instruction of the change-over switch B4 on the optical path. In this case, the control circuit B10 can recognize the type of an objective lens currently disposed on the optical path and the type of an objective lens to be disposed on the optical path after the change-over, based on an output from the revolver rotational position sensor B8. The control circuit B10 also reads out the stored focal position data from the objective lens data memory unit B3 in accordance with the objective lens to be disposed on the optical path after the change-over, controls the drive circuit B17 to rotate the motor B16 in a predetermined direction, and moves the stage B14 to the focusing position of the objective lens disposed on the optical path.

Next, description will be made on a case in which an objective lens is changed over to dispose an immersion objective lens on the optical path and another case in which an immersion objective lens is changed over to dispose another objective lens on the optical path.

Figure 12:
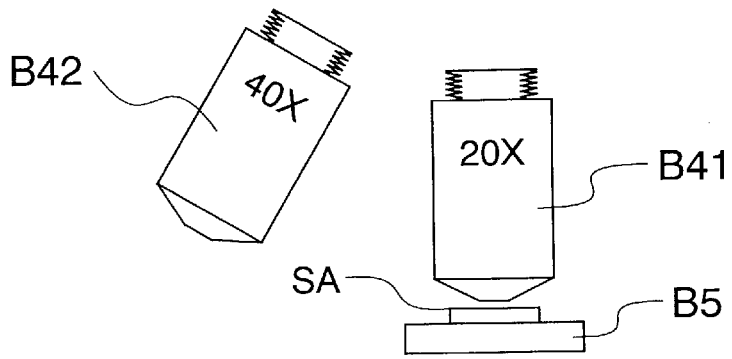
FIG. 12A shows a state in which a specimen is observed by a dry objective lens of 20 magnifications.
FIG. 12B shows a state in which each objective lens is stopped at a rotational position in the midst of a change-over.
FIG. 12C shows a state in which an immersion objective lens of 40 magnifications is disposed on an optical path.
Figure 12:
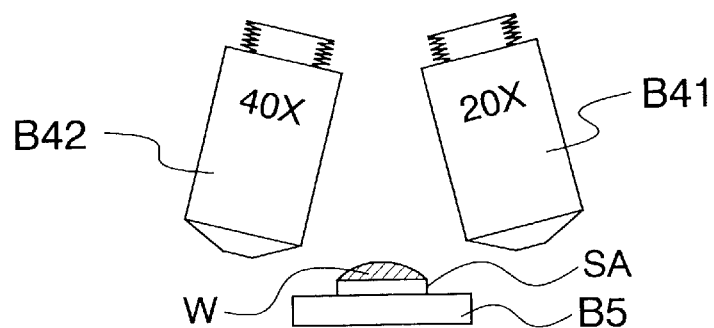
Figure 12:
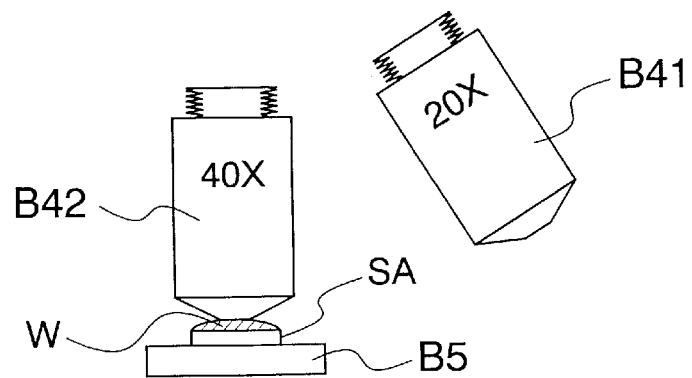

FIGS. 12A to 12C are views for showing states in which a dry objective lens of a magnification 20× is changed over to an immersion objective lens of a magnification 40×, in which FIG. 12A shows a state in which a specimen is observed by the dry objective lens of the magnification 20×, FIG. 12B shows a state in which the objective lenses are respectively stopped at rotational positions in the midst of the change-over, and FIG. 12C shows a state in which the immersion objective lens of the magnification 40× is disposed on the optical path.

As shown in FIG. 12A, after observing the specimen SA with the dry objective lens of the magnification 20×, the operator operates the revolver change-over switch B4 shown in FIG. 10 to issue a change-over instruction to the adjacent immersion objective lens of the magnification 40×. In this case, the control circuit B10 recognizes the type of the objective lens B41 currently disposed on the optical path and the type of the objective lens B42 to be disposed on the optical path next, on the basis of a detection signal from the rotational position sensor B8, a change-over instruction signal from the revolver change-over switch B4, and data stored in the memory unit B3.

Normally, when the objective lenses are to be changed over, the control circuit B10 sends a control signal to the revolver drive circuit B7 in such a manner that the revolver drive motor B6 is rotated by a predetermined number of pulses (for example, 100 pulses). Then, an objective lens is positioned on the optical path by a mechanical positioning system (for example, the click stop mechanism). However, as shown in FIGS. 12A to 12C, if the next objective lens is of the immersion type, the control circuit B10 halves the above-mentioned predetermined number of pulses (50 pulses as a result), so as to transmit a control signal to the revolver drive circuit B7. In this manner, as shown in FIG. 12B, the objective lens B42 is stopped at a substantially intermediate rotational position in the midst of the change-over. Here, the term "substantially intermediate" is used because the revolver drive circuit B7 does not conduct the positioning control, but conducts the drive control by an open loop, so that the objective lens may stop behind the intermediate position of the change-over path or may go too far due to inertia or friction. However, the essential point in this case is that the revolver body B40 is stopped at a rotational position in the midst of the change-over.

Since the revolver body B40 is stopped at the rotational position in the midst of the change-over in this manner, a liquid (water or oil) W required for an observation by an immersion objective lens can be easily applied on the specimen.

Here, when the revolver body B40 is stopped at a rotational position in the midst of the change-over, the revolver drive control circuit B7 may conduct the positioning control utilizing a closed loop, not an open loop.

After the liquid is applied on the specimen, the operator operates the revolver change-over switch B4 for the second time, so as to dispose the immersion objective lens of 40 magnifications which is a target objective lens of the change-over on the optical path. In this case, in the present embodiment, when the same switch as the switch previously instructed (for forward rotation or reverse rotation) is on, the immersion objective lens of the magnification 40× is disposed on the optical path, while the dry objective lens B41 of the magnification 20× is disposed on the optical path for the second time, as shown in FIG. 12A, when a different switch is on.

Also, when the revolver body B40 is disposed on a position destined by the change-over from the rotational position in the midst of the change-over, the control circuit B10 sets a velocity of rotation to be lower than a velocity of change-over, whereby air bubbles are hardly generated between the liquid W applied on the specimen SA and the tip end of the objective lens B42, thereby rendering a condition suitable for observing the specimen SA.

On the other hand, when the immersion objective lens is changed over to the next objective lens after the specimen is observed by the objective lens B42, the revolver body B40 is stopped at a rotational position in the midst of the change-over in the same manner as described above. The same is applied to a case in which the next objective lens is either of the immersion type or of the dry type. The reason is that if the next objective lens is of the dry type, it is necessary to remove the liquid W on the specimen SA, and if the next objective lens is of the immersion type, it is necessary to apply the liquid W again or to replenish the liquid.

Here, when the control circuit B10 is rotated at a velocity lower than the normal rotation velocity when the immersion objective lens B42 is removed from the optical path. With such structure, even if air bubbles are generated when the immersion objective lens B42 is disposed on the optical path, it is possible to conduct a work for removing the air bubbles, not manually, but by the electric force, by operating the revolver change-over switch B4 to dispose or remove the objective lens B42 on or from the optical path (for example, the conditions shown in FIG. 12C and FIG. 12B are repeated).

Next, an operation of the microscope of the present embodiment will be described below with reference to a flowchart shown in FIG. 13.

Figure 13:
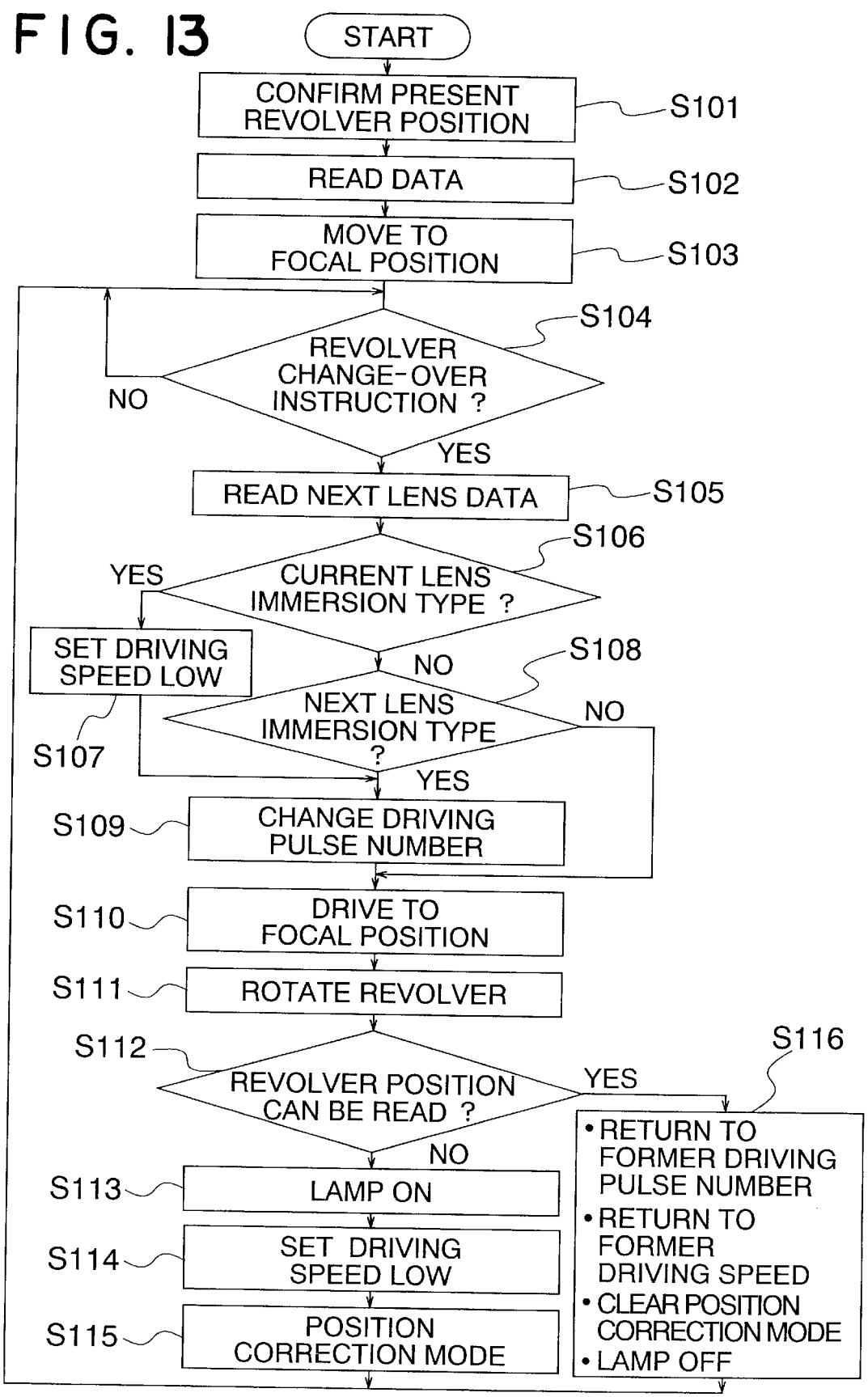
FIG. 13 is a flowchart for explaining a control sequence of the microscope.

FIG. 13 is a flowchart for showing a control sequence of the microscope to be effected by the control circuit B10.

First, the control circuit B10 confirms the revolver position (the address of a revolver hole disposed on the optical path), based on a signal from the revolver rotational position sensor B8 (step S101). After that, the data on an objective lens which is disposed at the revolver position is read out from the memory unit B3 (step S102). Then, the control circuit B10 drives the motor B16 through the drive circuit B17, based on the stored focal position data, so as to move the stage B14 to a focal position (step S103).

Next, the control circuit B10 judges whether there is a revolver change-over instruction from the revolver change-over switch B4 or not, and waits for the instruction (step S104). In the meantime, the operator can adjust the focus with accuracy by manually moving the stage B14 vertically while seeing an image of the specimen SA or can observe the specimen SA.

When the revolver change-over switch B4 is on, the control circuit B10 reads the data on the next objective lens (step S105), then judges whether the objective lens currently disposed on the optical path is of the immersion type or not (step S106). If the objective lens currently disposed on the optical path is not of the immersion type, the control circuit B10 judges whether an objective lens to be disposed on the optical path next is of immersion type or not (step 5108).

When the control circuit B10 judges that the objective lens currently disposed on the optical path is of the immersion type, a driving velocity of the revolver body B40 is set to Vs which is lower than the normal velocity Vn (step S107). These velocities Vn and Vs are predetermined and stored in the memory unit B3. The velocity Vs stored in the memory unit B3 can be changed by reading a set bar code for setting a different velocity from the velocity Vs by use of a bar code reader B21 shown in FIG. 11. The velocity Vs may be changed, for example, by pressing a ten key of a console panel connected to the control circuit B10.

After that, after the number of driving pulses when the revolver is driven is reduced to half (step S109), the stage B14 is driven to a focal position which is stored in accordance with the next objective lens (step S110). This number of driving pulses (50 pulses) is predetermined and stored in the memory unit B3. Also, the number of driving pulses when the revolver is stopped at a rotational position in the midst of the change-over of the revolver B40 (50 pulses in the present embodiment) can be changed (to 80 pulses, for example) by reading a set bar code for setting a different position by use of the bar code reader B21 shown in FIG. 11. This number of pulses may be changed, for example, by pressing the ten key of the console panel connected to the control circuit B10.

At step S108, when the next object lens is of the immersion type, the flow advances to step S109 mentioned above. Otherwise, the flow advances to step S110 mentioned above.

At step S110, after the stage position is disposed at the focal position of the next objective lens, the revolver is rotated (step S111). In this case, if the objective lens before the change-over is of the immersion type (judged "YES" at step S106), the revolver body B40 is rotated at the lower velocity Vs up to the rotational position in the midst of the change-over. If the objective lens before the change-over is not of the immersion type, but the objective lens after change-over is of the immersion type (judged "YES" at step S108), the revolver body B40 is rotated at the normal velocity Vn up to the rotational position in the midst of the change-over. In addition, if neither of the both cases is applied, except the case where the objective lenses before and after the charge-over are the immersion objective lenses the revolver body is rotated at the normal velocity up to the rotational position after the change-over of the objective lens.

Next, the control circuit B10 reads the position of the revolver body B40 based on a signal from the revolver rotational position sensor B8 (step S112). In this case, when the revolver position can not be read, the control circuit B10 judges that no objective lens is disposed on the optical path, so as to light a lamp B60 (step S112). After that, the rotation velocity of the revolver is set to be low (Vs) (step S114) and the control of rotating drive is set in a position correction drive mode. If the rotation velocity is already set to be low (Vs) at step S114, the velocity is maintained as it is.

The position correction mode will be described below. Normally, when the revolver body B40 is rotated, the rotation is controlled in such a manner that the revolver body B40 is moved only by a predetermined number of pulses. However, in the position correction mode, the control is effected in such a manner that the revolver body B40 is moved at the low velocity (Vs) until the revolver body B40 is confirmed to be disposed at the normal rotational position (until a signal from the revolver rotational position sensor B8 is obtained).

After the position correction mode is set at step S115, the flow returns to step S104 to wait an instruction for change over the revolver body B40 for the second time. If there is the instruction to change over the revolver body B40 at step S104, the program repeats the steps from S104 to S110 for the second time, so as to rotate the revolver body B40 in the position correction mode at step S111. This operation is repeated until the revolver position is confirmed at step S112. It should be noted that when the position correction mode is set, the revolver B40 is rotated at a low velocity at step S111, irrespective of alteration at S109. If the revolver position is confirmed at step S112, the number of revolver driving pulses and the driving velocity are returned to those before the position correction mode is set, the position correction mode is cleared, and the lamp is put out (step S116). Then, the program returns to step S104 for the second time, and waits for an instruction to change over the revolver body B40.

As described above, in the microscope of the present embodiment, the revolver B40 is stopped at a rotational position in the midst of the change-over when the objective lens is changed over to one of the immersion type and when the immersion objective lens is changed over to another objective lens, so that it becomes much easier to conduct operations of filling, reapplying and removing a liquid to be used for the immersion objective lens. Also, when the immersion objective lens is disposed or removed on or from the optical path, the revolver body B40 is moved at a low velocity, so that air bubbles hardly enter in the liquid between the objective lens and the specimen and there is no chance for the liquid for scattering around. Moreover, when no objective lens is disposed on the optical path, the revolver body B40 is rotated until the objective lens is correctly disposed on the optical path in the position correction mode, so that it is possible to correctly dispose the objective lens on the optical path by a simple operation. This is not limited to a case where an immersion objective lens is used, but can be applied also to the cases where the revolver body B40 is manually rotated to remove the objective lens from the optical path or where the positioning control at the time of change-over of objective lenses is not conducted properly due to wear and tear of the revolver.

Also, the present embodiment is arranged such that an objective lens is changed over to an adjacent objective lens one by one by use of the forward rotation switch B4a and the reverse rotation switch B4b. However, the console panel may be provided with buttons corresponding to all of the objective lenses mounted on the revolver, so that any objective lens may be directly inserted into the optical path of the microscope by pressing the corresponding button. In this case, when an instruction to change over to the immersion objective lens, the total number of pulses up to the change-over can be first obtained, and an arbitrary number of pulses can be subtracted from this number of driving pulses (for example, 50 pulses), so as to effect control such that the revolver is driven by a difference obtained from this subtraction. In this manner, the revolver is stopped at a rotational position before the objective lens of the immersion lens is disposed on the optical path so as to obtain the same effects as those in the foregoing embodiment.

What is claimed is:

1. An electric revolver device comprising:

a revolver body which retains a plurality of objective lenses;

a positioning device which mechanically positions said revolver body at a predetermined rotational position;

an instruction device which instructs a change-over of said plurality of objective lenses;

a motor which drives and rotates said revolver body;

a rotation detecting device which detects an amount of rotation of said motor;

a memory device which stores data according to the amount of rotation of said motor at the time of change-over of the objective lenses in accordance with data of said plurality of objective lenses; and a drive control device which reads out the data stored in said memory device in response to the instruction of change-over from said instruction device and drives said motor until said read-out data concurs with the amount of rotation of said motor detected by said rotation detecting device.

2. An electric revolver device according to claim 1, wherein said motor is a DC motor and said rotation detecting device is a rotary encoder integrally formed with said motor.

3. An electric revolver device according to claim 1, wherein the data according to the amount of rotation of said motor stored in said memory device is substantially corresponding to the central angle between apertures for installing said plurality of objective lenses, and said drive control device comprises a detection unit for detecting that the amount of rotation of said motor reaches an amount of rotation corresponding to said read-out data, so as to apply the brake on and stop the rotation of said motor in response to a signal from said detection unit.

4. An electric revolver device according to claim 1, further comprising a setting device capable of separately setting each of plural pieces of data in said memory device as data each in accordance with an amount of rotation of said motor.

5. An electric revolver device according to claim 1, further comprising a position detecting device for detecting whether a rotational position of said revolver body is at the stop position regulated by said positioning device or not, wherein when said revolver body is not positioned at said stop position, said drive control device corrects the rotational position of said revolver body to dispose the revolver body at said stop position in response to a signal from said position detecting device.

6. An electric revolver device according to claim 5, wherein said drive control device updates the data stored in said memory device corresponding to the objective lens with the corrected position of rotation, based on the information on the amount of rotation of said motor when the rotational position of said revolver is corrected.

7. An electric revolver device comprising:

a revolver body which retains a plurality of objective lenses;

an instruction device which instructs a change-over of said plurality of objective lenses;

a motor which drives and rotates said revolver main body;

a rotation detecting device which detects information according to an amount of rotation of said motor;

a memory device which stores plural pieces of data according to the amount of rotation of said revolver body at the time of change-over of the objective lenses in accordance with data of said plurality of objective lenses;

a setting device which is capable of separately setting each of said plural pieces of data stored in said memory device; and a drive control device which controls the drive of said motor in response to a change-over instruction form said instruction device in accordance with said plural pieces of data stored in said memory device.

8. An electric revolver device comprising:

a revolver body which retains a plurality of objective lenses;

an instruction device which instructs a change-over of said plurality of objective lenses;

a motor which drives and rotates said revolver main body;

a rotation detecting device which detects information according to an amount of rotation of said motor;

a memory device which stores plural pieces of data according to the amount of rotation of said revolver body at the time of change-over of the objective lenses in accordance with data of said plurality of objective lenses;

a drive control device which controls the drive of said motor in response to a change-over instruction form said instruction device in accordance with said plural pieces of data stored in said memory device;

a positioning device which mechanically positions said revolver body at a predetermined rotational position; and position detecting device which detects whether the rotational position of said revolver body is set at a stop position regulated by said positioning device or not, wherein said drive control device sets said revolver body to said stop position by correcting the rotational position of said revolver body in response to a signal from said position detecting device when said revolver body is not positioned at said stop position.

9. An electric microscope comprising:

a plurality of objective lenses;

a revolver body with said plurality of objective lenses mounted thereon any one of which lenses disposed on an optical path;

a revolver position detecting unit which detects a rotational position of said revolver body so as to obtain information on the objective lens disposed on said optical path;

an instruction unit which issues an instruction for changing over the objective lens disposed on said optical path by electric force;

a memory unit which stores information whether each of said plurality of objective lenses is of liquid immersion type or not; and a control unit which controls the drive of said revolver body so as to stop said revolver body at a rotational position in the midst of the change-over of said revolver body when it judges that at least one of the objective lens currently on the optical path and an objective lens to be disposed next on the optical path is an immersion objective lens, based on a signal from said revolver position detecting unit and the information stored in said memory unit when receiving a change-over instruction from said instruction unit.

10. An electric microscope according to claim 9, further comprising an alarming member which is connected to said control unit, and is adapted to report the operator that no objective lens is disposed on the optical path when said revolver body is stopped at a rotational position in the midst of the change-over.

11. An electric microscope according to claim 9, wherein said control unit controls the drive of said revolver body in such a manner that when it receives an instruction of change-over from said instruction unit for the second time after said revolver body is stopped at the rotational position in the midst of the change-over, said instructed objective lens is disposed on the optical path.

12. An electric microscope according to claim 9, wherein said control unit rotates and controls said revolver body at a lower velocity than the normal change-over velocity when said immersion objective lens is removed from said optical path or inserted into said optical path.

13. An electric microscope according to claim 9, further comprising a data input unit for receiving information on said plurality of objective lenses mounted on said revolver body.

14. An electric microscope according to claim 9, further comprising a motor for driving and rotating said revolver body which is rotated together with said plurality of objective lenses and an encoder for detecting an amount of rotation of said motor, and said control units judges whether the revolver body is at the rotational position in the midst of the change-over on the basis of an output from said encoder.

* * * * *